(No Model.)
J. W. REGAN.
HOSE COUPLING AND SUPPORT.
No. 256,163. Patented Apr. 11, 1882.
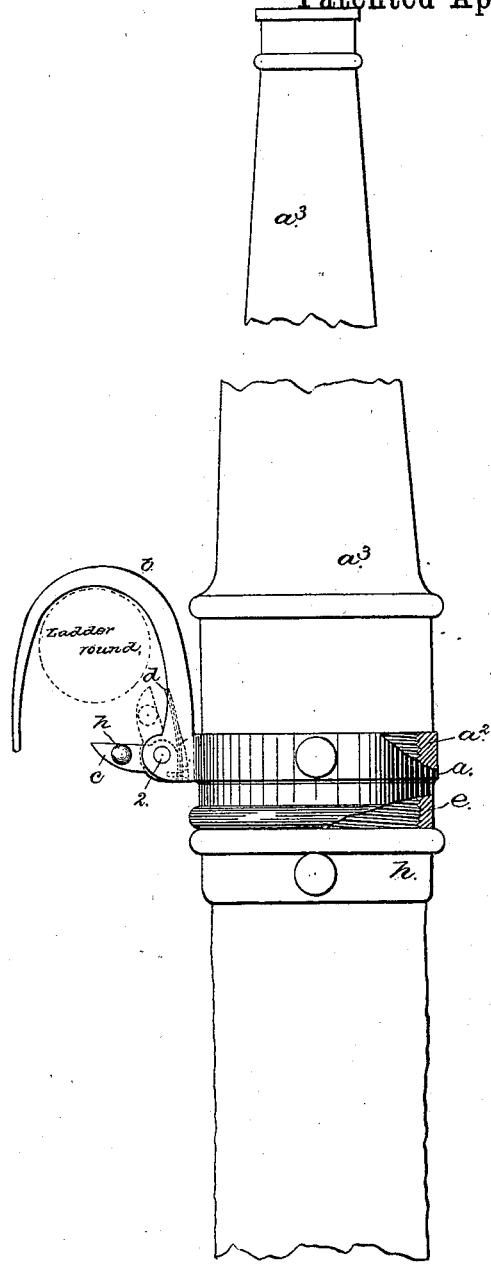
Witnesses.
John F. C. Prembert
L. F. Connor.
Inventor:
John W. Regan
by Crosby & Gregory
Attys.

UNITED STATES PATENT OFFICE.

JOHN W. REGAN, OF BOSTON, MASSACHUSETTS.

HOSE COUPLING AND SUPPORT.

SPECIFICATION forming part of Letters Patent No. 256,163, dated April 11, 1882.

Application filed January 7, 1882. (No model.)

*To all whom it may concern:*

Be it known that I, JOHN W. REGAN, of Boston, county of Suffolk, State of Massachusetts, have invented an Improvement in Hose Couplings and Supports, of which the following description, in connection with the accompanying drawing, is a specification.

My invention relates to an attachment for discharge-pipes to be used with hose for fire-department purposes; and it consists in the combination, with the usual discharge-pipe to be attached to the male thread of the coupling at the end of a length of hose, of a threaded ring provided with a supporting-hook, the hook being adapted to engage a round of a ladder to sustain the discharge-pipe and the hose with which it is attached. The hook projecting from one side of this ring is provided with a fastening-catch, which is pivoted so as to turn aside as the hook is slipped over the round of the ladder, after which the said catch will be thrown out beneath the said round by a suitable spring, so that the hook cannot become accidentally disengaged therefrom. To remove the pipe and hose from the ladder, or to change its position, the fastening-catch can be turned aside by the operator, when the supporting-hook can be lifted off the round of the ladder.

The drawing shows in side elevation a discharge-pipe having secured to it my improved attachment, the hook of which is adapted to be engaged with the round of a ladder and support the discharge-pipe and the length of hose upon which the attachment is screwed.

The threaded ring $a$, having a series of threads, $a^2$, to connect it with the discharge-pipe $a^3$, is provided with a supporting-hook, $b$, herein shown as a portion of the ring $a$, and formed by casting therewith, the hook being adapted to slip over the round of a ladder, to thus sustain the discharge-pipe and the weight of the hose connected therewith. The ring $a$ has screw-threads $e$ to engage the threaded male part of the hose-coupling $h$, secured to the end of the line of hose being used in any usual manner. A fastening or dog, $c$, pivoted at 2, near the end of one arm of the said hook, is pressed by the spring $d$ into the position shown in full lines, to stand across and close the passage into the hook, to thus prevent the latter from becoming accidentally disengaged from the round of the ladder or other support on which the hook is hung. The spring $d$ yields to permit the catch $c$ to turn aside, as shown in dotted lines, when the hook is placed on the round of the ladder, and the said catch may be turned in this position by the operator when it is desired to again lift the hook off the round of the ladder, the said catch being shown as provided with a handle, $h$, for this purpose. The ladder-round is shown in dotted lines.

I claim—

1. The ring $a$, adapted to be secured to the discharge-pipe and to a hose-coupling, combined with the supporting-hook adapted to engage the round of a ladder, substantially as and for the purpose set forth.

2. The combination, with the threaded ring $a$ and the hook thereon, of a fastening-catch adapted to extend across the opening of the hook to prevent its accidental disengagement from its support, substantially as described.

In testimony whereof I have signed my name to this specification in the presence of two subscribing witnesses.

JOHN W. REGAN.

Witnesses:
G. W. GREGORY,
B. J. NOYES.